(No Model.)

J. T. WELLS.
ANIMAL TRAP.

No. 550,147. Patented Nov. 19, 1895.

WITNESSES:
Paul Johst
Wm. P. Patton

INVENTOR
J. T. Wells
BY
Munn & Co.
ATTORNEYS.

UNITED STATES PATENT OFFICE.

JOB T. WELLS, OF CANDO, NORTH DAKOTA, ASSIGNOR OF FORTY-NINE ONE-HUNDREDTHS TO CHARLES E. HUNTER AND FRANK V. HUNTER, OF SAME PLACE.

ANIMAL-TRAP.

SPECIFICATION forming part of Letters Patent No. 550,147, dated November 19, 1895.

Application filed March 26, 1895. Serial No. 543,251. (No model.)

*To all whom it may concern:*

Be it known that I, JOB T. WELLS, of Cando, in the county of Towner and State of North Dakota, have invented a new and Improved Animal-Trap, of which the following is a full, clear, and exact description.

This invention relates to an improved animal-trap of the self-setting type, and has for its object to provide a trap of the indicated character which will be simple and practical in construction and that will be adapted to catch birds, such as swallows, or animals, large or small, that may be allured by bait.

The invention consists in the construction and combination of parts, as is hereinafter described and claimed.

Reference is to be had to the accompanying drawings, forming a part of this specification, in which similar figures of reference indicate corresponding parts in all the views.

Figure 1:
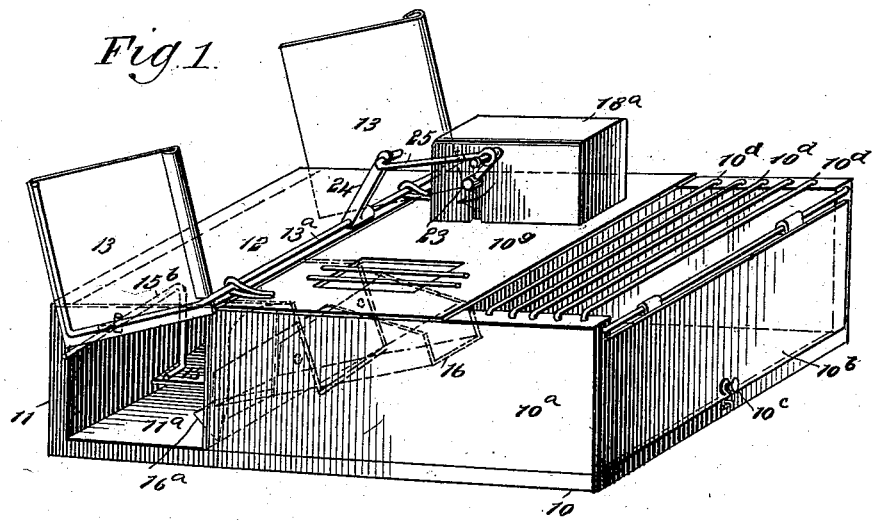
Figure 2:
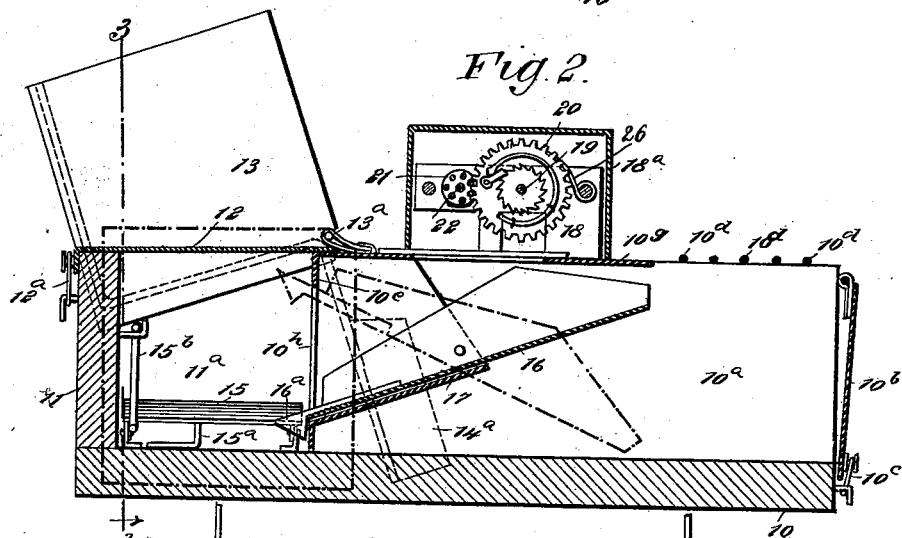
Figure 3:
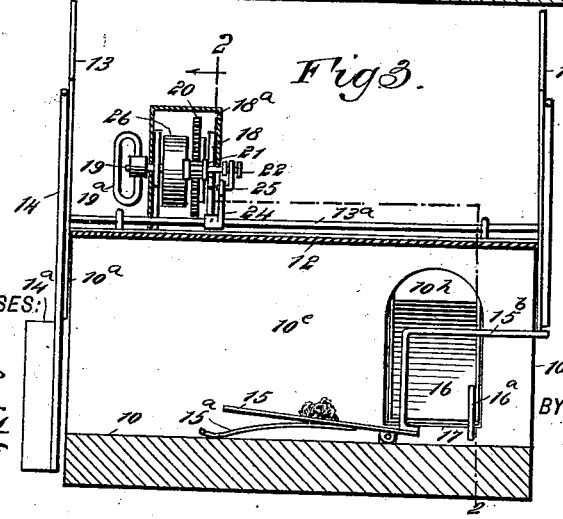

Figure 1 is a perspective view of the improved trap with working parts shown adjusted to receive an animal. Fig. 2 is a partly sectional side view substantially on the line 2 2 in Fig. 3, and Fig. 3 is a transverse sectional view substantially on the line 3 3 in Fig. 2.

The improved trap may be proportioned in dimensions to take captive large wild animals or smaller game; but its preferred use is for capturing rodents, such as gophers, rats, or mice, and is shown in form best adapted for entrapping the last-mentioned vermin.

To carry into effect the features of improvement, a rectangular cage is provided, which is constructed as follows: On a rectangular base-board 10 two side walls $10^a$ are erected that are preferably parallel, and at one end a door $10^b$ is hinged on a transverse rod or by other means, so as to hang pendent from the upper edges of the side walls and be adapted to close what may be termed the "rear" end of the cage, a hook and catch $10^c$ being provided for the retention of the door in closed condition. The top of the cage is partly closed by a series of spaced rods $10^d$, which extend across the space between the side walls $10^a$ and are thereto secured at their ends, as indicated in Fig. 1. The front end of the cage is closed by a preferably metal wall-piece $10^e$, that may be extended over the top, so as to cover the space forward of the transverse rods $10^d$, as shown at $10^g$ in Figs. 1 and 2. The base-board 10 projects forward of the end wall $10^e$ sufficiently to afford a base for the transverse passage-way $11^a$, that is produced in front of the end wall $10^e$ by the erection of a substantial front cross-wall 11 at or near the front transverse edge of the base-board 10. A preferably removable top or cover plate 12 is temporarily secured over the passage-way $11^a$ by an interlocking engagement of its rear transverse edge with catches formed on the top plate $10^g$ and with a simple hook and catch $12^a$, that is adapted to connect the front edge of the cover-plate with the wall 11, as shown in Fig. 2.

Two wings 13, that are preferably formed of metal plates, are supported free to rock from opposite points by a transverse pintle-rod $13^a$, which is hinged to the forward top corner of the cage, the relative position of the hinged rod adapting the wings to close the ends of the passage-way $11^a$ when said wings are rocked downwardly a sufficient degree. Preferably the joint heft of the wings 13 is slightly overbalanced by the weight-block $14^a$, which is on an arm 14, that projects rearwardly from the upper part of one wing, so that the weight of the block will have a tendency to throw the wings upwardly if the latter were permitted to freely move in response to the heft of the weight-block.

In the passage-way $11^a$, near the middle of the same, a platform 15 is pivotally supported at one end, so that its other edge may vibrate from and toward the base-board whereon the platform is sustained, and the free edge of the platform is normally lifted a proper degree by a spring $15^a$, as plainly represented in Fig. 3. From the platform 15, near its pivoted end, an arm $15^b$ is upwardly and then outwardly extended, the said right-angle bent arm having its free end portion projected slightly outside of the passage-way, so that the wing 13, which is nearest to the hinged end of the platform, will receive support from the arm mentioned when the latter is outwardly projected by the upward movement of the spring-pressed platform at its free edge, as shown in Fig. 3.

The transverse cage-wall $10^e$ is apertured at $10^h$ between the side of the cage and near the pivoted end of the platform 15, and at each side of the aperture a wall is produced, which affords a lateral continuation of the passage-way 11ª into the cage.

There is a tilting table 16, pivoted in the lateral passage-way, that extends from the aperture 10ʰ, which table is so supported that the end nearest the aperture 10ʰ is afforded greater weight than the end portion of the table that projects into the cage, so that the table will be inclined with its lower end resting on the lower edge of the aperture 10ʰ. Below the tilting table 16 an inwardly-extending and similarly-inclined guard-wall 17 is secured, and on the table 16 a guard-limb 16ª is attached so as to project its pointed end out into the passage-way 11ª.

An essential feature of the invention consists of a spring-actuated device, which is located on the top wall of the cage and has connection with the pintle-rod 13ª for the rocking movement of said rod and of the wings 13, the said device comprising the following-described parts.

On a suitable frame-support 18 a spring-driven shaft 19 is journaled, and on the shaft a gear-wheel 20 is secured, which is meshed with a pinion 21, that is rotatably supported by a counter-shaft 22, which loosely engages the frame 18. A crank-arm 23 is secured on one projecting end of the counter-shaft 22, and on the pintle-rod 13ª a rock-arm 24 is affixed at a point which will permit the rock-arm and crank-arm to be loosely connected by a link-rod 25, that is pivoted at its ends on the free ends of said arms.

The spring 26, that encircles the shaft 19 and is fastened to it at one end and to a crossbar of the frame 18 at its other end, is adapted to rotate the shaft 19 in one direction and the counter-shaft 22 in an opposite direction, as indicated by the curved arrow in Fig. 1, and it will be seen that when the link is in the position shown in said figure the spring 26 will be adapted to exert its force to rock the arm 24 rearwardly, and thus throw the wings 13 upwardly, the half-rotation of the counter-shaft in the indicated direction serving to reverse the longitudinal movement of the link-rod 25, which will push the rock-arm 24 forwardly and correspondingly depress the wings.

The frame 18 may be incased by a box 18ª, if desired, the latter having suitable openings to permit the main shaft and counter-shaft to project through its side walls, and on the main shaft 19 a turn-button 19ª is placed for winding the spring 26, a ratchet and pawl holding the shaft in the usual way. Any suitable bait is placed in the passage-way 11ª, preferably on the platform 15, and thereto secured. The trap is then placed in a locality frequented by mice. As the passage-way 11ª is normally open at each end, the rodent is deceived and allured to approach the bait, passing onto the platform to get at it. The weight of the animal will depress the free end of the platform, which will withdraw the outer end of the arm 15ᵇ from below the wing 13, which is sustained in an elevated position by it. The spring 26 will now partly rotate the counter-shaft through its geared connection and instantly and completely close the open passage-way 11ª by depressing the wings 13, as is indicated by dotted lines in Fig. 2. The rodent being timid will become frightened by the noise thus produced and seek to escape from the now darkened passage-way, and as there is light in the cage the animal naturally moves up the inclined table 16 to reach the apparently empty space beyond, the result being that the table tilts the mouse into the cage, from whence there is no escape. The entrance of the mouse within the cage relieves the platform 15 of its weight, and the spring 15ª is then free to throw up the free end of said platform, which will project the arm 15ᵇ outwardly and arrest the descent of the wings 13, which have been thrown up and then caused to descend, owing to the semi-rotation of the counter-shaft 22 and consequent rocking movement produced in the rock-arm 24. The trap is now set for a repetition of the catching operation if another rodent seeks to get the bait.

Having thus described my invention, I claim as new and desire to secure by Letters Patent—

1. In an animal trap, the combination with a cage having a normally open transverse passage at one end, of wings supported to rock and close or open the ends of the passage, a hinged and spring-supported platform in the said passage, an arm extended from the platform and adapted to hold the wings elevated when the platform is raised by its spring support, a lateral passage extending from the transverse passage into the cage, a tilting table in said lateral passage, and a spring-actuated device adapted to rock the wings and close and open the transverse passageway, as the platform is pressed down and then released from pressure, substantially as described.

2. In an animal trap, substantially as described, the combination with the cage, having a transverse passageway open at its ends, which passageway is intersected by a lateral passage opening into the cage, of wings or gates sustained in parallel planes on the ends of a journaled pintle rod and adapted to open or close said transverse passage way, a rock arm on said pintle rod, a rotatable spring driven shaft geared with a parallel counter shaft whereon a crank arm is fixed, and a link rod connecting the rock arm and crank arm, whereby the pintle rod is alternately rocked in opposite directions to raise and lower the wings, as specified and for the purpose set forth.

3. In an animal trap, the combination of a cage having a transverse passage at one end, the ends of the passage being normally open, a gate hinged at each end and adapted to swing past said ends to close them, a rockable shaft to which the said gates are fixed, a crank arm on the shaft, a link pivoted to the crank arm, a shaft journaled in bearings fixed to the cage, a spring wound around the shaft and actuating the same, a crank connected to the shaft and also to the link aforesaid, a platform within the passage, the platform being pivoted and spring-supported, a rod arising from the platform and in engagement with one of the gates whereby the two are supported, and a second passage extending at right angles to the first, substantially as described.

4. In an animal trap, the combination of a cage having at one end a transverse passage with normally open ends, a gate for closing each end of the passage and mounted so as to slide by said ends in the operation of closing them, a shaft to which the gates are fixed and whereby they are mounted, spring mechanism connected to the shaft for actuating the gates, a pivoted and spring supported platform within the passage provided with means for supporting the gates against the operation of the spring device, and a second passage extending at right angles to the first and into the interior of the cage, substantially as described.

5. In an animal trap, the combination of a cage having at one end a transverse passage with normally open ends, a gate at each end of the passage and hinged on an axis parallel with the longitudinal disposition of the passage, spring mechanism connected with the gates and capable of opening or closing them, and means within the passage whereby the gates may be held against the operation of the spring devices and released upon the entry of a victim, substantially as described.

JOB T. WELLS.

Witnesses:
CURTIS J. LORD,
P. H. BUCHHOLZ.